(12) United States Patent
Bjorklund et al.

(10) Patent No.: US 9,120,685 B2
(45) Date of Patent: Sep. 1, 2015

(54) METHOD FOR RECYCLING DEOILED WATER USING COUNTERFLOW FALLING-FILM EVAPORATORS

(75) Inventors: Daniel P. Bjorklund, Waukesha, WI (US); David Kersey, Frankfort, IL (US); Gregory J. Mandigo, Crivitz, WI (US); Chandrakant Tiwari, Oconomowoc, WI (US)

(73) Assignee: AQUATECH INTERNATIONAL CORPORATION, Canonsburg, PA (US)

( * ) Notice: Subject to any disclaimer, the term of this patent is extended or adjusted under 35 U.S.C. 154(b) by 371 days.

(21) Appl. No.: 13/323,083

(22) Filed: Dec. 12, 2011

(65) Prior Publication Data

US 2012/0145386 A1    Jun. 14, 2012

Related U.S. Application Data

(60) Provisional application No. 61/422,965, filed on Dec. 14, 2010.

(51) Int. Cl.
| | |
|---|---|
| *E21B 43/34* | (2006.01) |
| *C02F 1/04* | (2006.01) |
| *B01D 1/06* | (2006.01) |
| *B01D 1/28* | (2006.01) |
| *B01D 5/00* | (2006.01) |
| *C02F 1/20* | (2006.01) |

(Continued)

(52) U.S. Cl.
CPC .............. *C02F 1/048* (2013.01); *B01D 1/065* (2013.01); *B01D 1/28* (2013.01); *B01D 5/006* (2013.01); *C02F 1/20* (2013.01); *C02F 1/40* (2013.01); *C02F 2101/32* (2013.01)

(58) Field of Classification Search
CPC ............ B01D 1/065; B01D 1/28; B01D 5/006
USPC .......... 166/267, 272.3, 303; 210/177; 203/12, 203/16, 139

See application file for complete search history.

(56) References Cited

U.S. PATENT DOCUMENTS

| | | | |
|---|---|---|---|
| 4,067,779 A | * | 1/1978 | List et al. ................ 203/28 |
| 7,428,926 B2 | | 9/2008 | Heins |

(Continued)

OTHER PUBLICATIONS

International Search Report for PCT/US2011/064406 dated Apr. 5, 2012 (Form PCT/ISA/210).

(Continued)

*Primary Examiner* — Zakiya W Bates
*Assistant Examiner* — Silvana Runyan
(74) *Attorney, Agent, or Firm* — Buchanan Ingersoll & Rooney PC (57) ABSTRACT

A method for treatment of produced water, particularly deoiled water, by evaporation. Methods use a vertical tube heat exchanger bundle where the brine is distributed in a falling film along the inside of the tube wall. Condensing steam causes a portion of the deoiled water to evaporate; this water vapor travels upward in a counterflow direction relative to the deoiled water. Evaporator sump volume is minimized, and evaporators may have a multi-piece construction to lower the center of gravity of an evaporator installation. This technology provides several advantages over conventional vertical tube co-current flow evaporators (where the vapor flows downward with the falling film). These advantages include a minimal total installed cost (TIC) and enhanced water chemistry management.

22 Claims, 8 Drawing Sheets

(51) Int. Cl.
    *C02F 1/40* (2006.01)
    *C02F 101/32* (2006.01)

(56) References Cited

U.S. PATENT DOCUMENTS

| | | | |
|---|---|---|---|
| 7,909,098 B2* | 3/2011 | Minnich et al. | 166/266 |
| 8,535,538 B1* | 9/2013 | Keeling et al. | 210/664 |
| 2008/0110630 A1 | 5/2008 | Minnich et al. | |
| 2008/0190607 A1 | 8/2008 | Minnich et al. | |
| 2010/0038081 A1* | 2/2010 | Gamache et al. | 166/267 |
| 2011/0061867 A1* | 3/2011 | Bjorklund et al. | 166/272.1 |

OTHER PUBLICATIONS

Written Opinion of the International Searching Authority for PCT/US2011/064406 dated Apr. 5, 2012 (Form PCT/ISA/237).
Canadian Office Action dated Oct. 2, 2014 for Serail No. 2,821,118.
Thermal-FluidsPedia, "Basics of evaporation", Thermal FluidPedia, https://www.thermalfluidscentral. org/encyclopedia/index.php./Basics_of_evaporation, Jul. 6, 2010.

* cited by examiner

VAPOR OUT

RECIRCULATION PUMP

56 FEET

27 FEET

METHOD FOR RECYCLING DEOILED WATER USING COUNTERFLOW FALLING-FILM EVAPORATORS

CROSS-REFERENCE TO RELATED APPLICATIONS

This application claims priority to U.S. Provisional Patent Application No. 61/422,965, filed on Dec. 14, 2010. That application is incorporated by reference herein.

BACKGROUND OF THE INVENTION

1. Field of the Invention

Embodiments of the invention relate to methods, systems, and apparatus for recycling deoiled water for heavy oil production.

2. Background of the Related Art

Oil may be extracted from underground reserves using a number of processes. One of those processes is steam-assisted gravity drainage (SAGD). In a typical SAGD process, steam is used for downhole injection to increase the flowability of oil and allow it to be withdrawn from a formation. This process generates a large volume of water that includes oil and other contaminants that flows to the surface through a producing well. It is important for the process to recycle this water for two primary reasons.

First, the boiler that produces the steam for the SAGD process requires a large feed water flow rate, typically 3 to 6 times the volume of oil being produced. For reasons of water conservation and to minimize the impact on certain external water resources (such as fresh water and brackish water) this boiler feed water requirement can typically be satisfied to a high degree (>90%) by recycling the water returning to the surface in the producing well.

Second, the water returning to the surface in the producing well contains contaminants that do not allow this water stream to simply be discharged to the environment.

For reasons of expense and potential environmental impact associated with the extraction, use, and disposal of large amounts of water, it is desirable to re-use water in the SAGD process.

One component that may be used in recycling of SAGD produced water is an evaporator. Co-current vertical-tube falling-film (VTFF) evaporators have historically been used exclusively for this application. Reasons for their common use include 1) the ability to provide a large amount of useable heat transfer surface area in a single vessel, 2) the large amount of heat transfer surface area allows the evaporation capacity per evaporator to be maximized, 3) the vertical design effectively minimizes overall footprint (plant space requirement), 4) the high overall heat transfer coefficient (HTC) that is achievable compared to other evaporator styles, 5) the relatively low power consumption requirement (per gallon of distillate produced) compared to other evaporator styles (achieved with high HTC) and 6) the co-current evaporator is naturally designed with a large sump volume which has traditionally been thought a requirement for water chemistry management.

Figure 1:
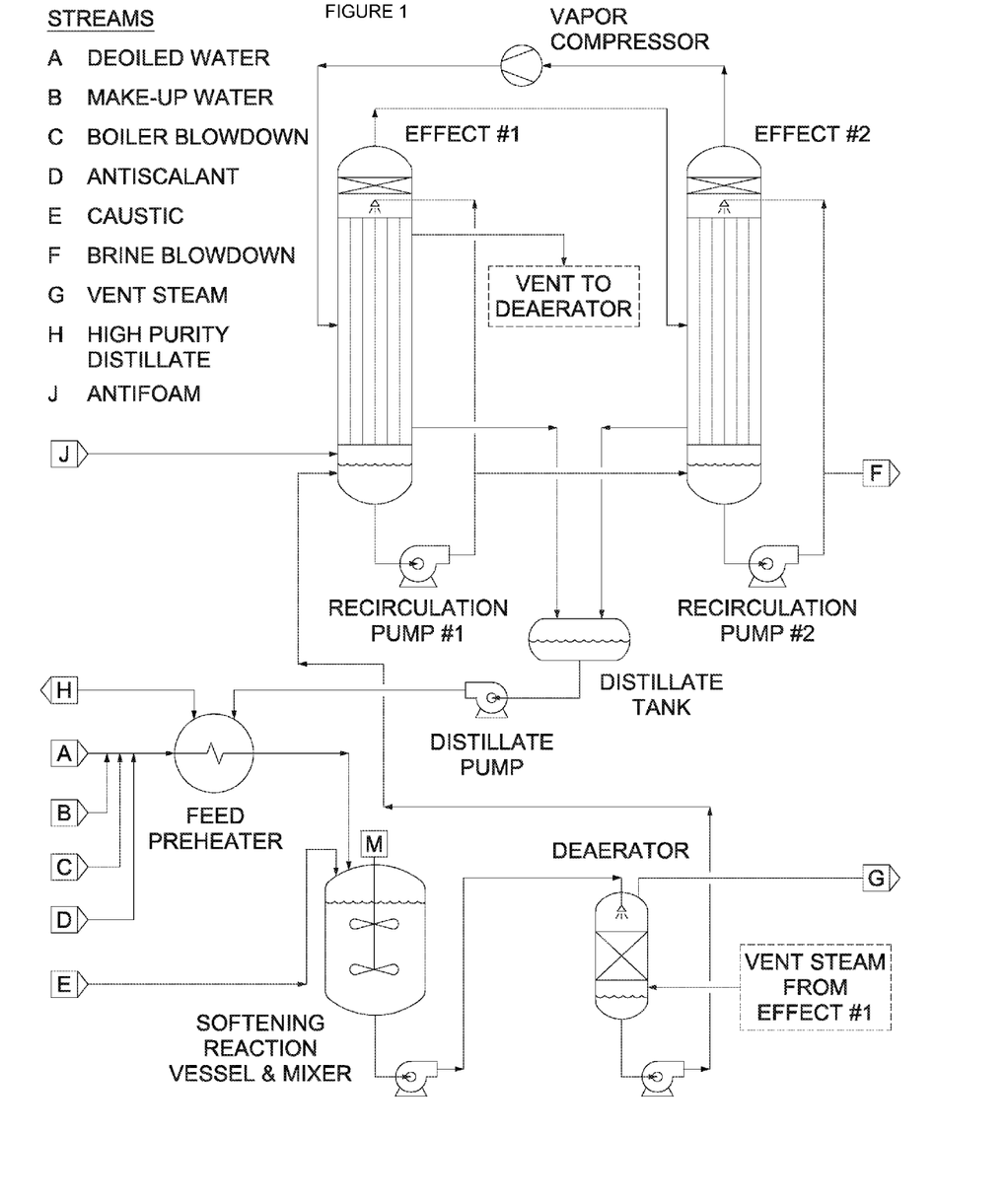
FIG. 1 shows a process flow diagram of one embodiment of the invention.
Figure 2:
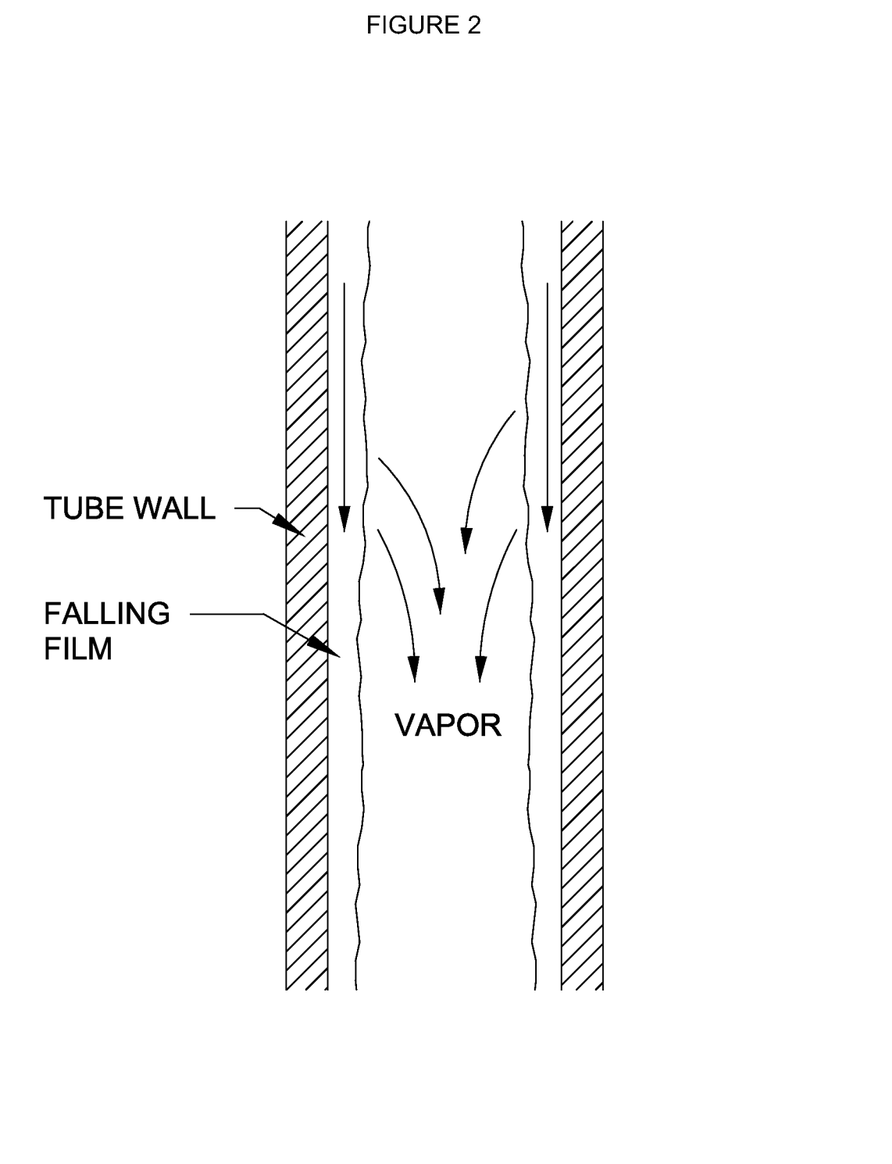
FIG. 2 shows a close-up view of the vapor being generated and flowing co-currently with the falling film in a conventional co-current flow evaporator.
Figure 3:
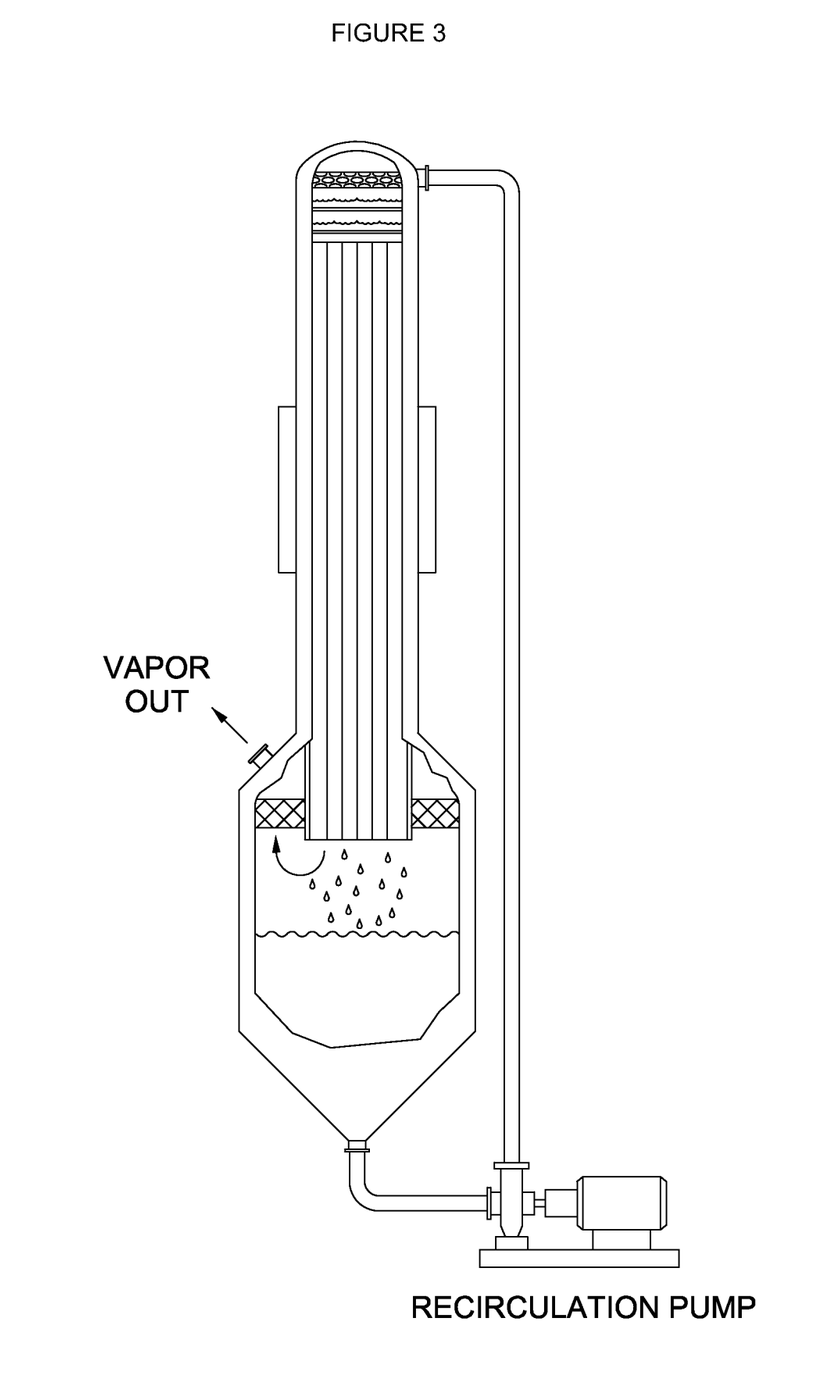
FIG. 3 shows a drawing of a conventional co-current VTFF evaporator in which the vapor flows in the same direction as the falling film and is disengaged at the bottom of the heat exchanger.

Co-current VTFF evaporators work by continuously circulating a large volumetric flow rate of water from the evaporator sump to the top-head where the brine is distributed into the heat transfer surface (tubes) as a falling film. As steam condenses on the outside of the tubes, a portion of the falling film is vaporized and travels downward with the falling film where the vapor is disengaged and flows out of the evaporator, (refer to FIGS. 2 and 3).

The co-current evaporator is physically very tall and can extend as high as 150 feet above grade. Approximately one-third of this height is due to the heat transfer surface requirements (vertical tube length) while the balance of the extreme height is mostly due to the significant requirements of the evaporator sump. The evaporator sump is required to be very large for three primary reasons. First, sufficient volume must be provided (below the bottom-tube sheet and above the sump liquid level) to allow the vapor to be released from the evaporator tubes and to be released out of the evaporator vessel. Second, a certain minimum sump volume is required to allow the recirculation pump to be initially started without starving the pump. The liquid level in the evaporator sump will rapidly drop upon initial start-up of the recirculation pump as volume is taken from the sump and fills the recirculation piping, fills the top-head and coats the evaporator tubes. The sump must be large enough to allow this change in volume without immediately starving the recirculation pump. Note that the opposite is also true upon a recirculation pump stop: the water being held-up in the evaporator and recirculation piping will collect very quickly in the evaporator sump immediately after the recirculation pump is stopped. The sump volume must be large and sufficient to accommodate both of these common transient operating scenarios. This is inherent in the design of any co-current VTFF evaporator.

Finally, the sump must also contain a large volume to achieve a chemical equilibrium prior to circulating the brine water to the top-head and distributing onto the heat transfer surface. If chemical equilibrium is not achieved prior to circulation onto the tubes, the dissolved components will tend to precipitate and will form a scale on the evaporator tubes causing the heat transfer efficiency to diminish rapidly. The evaporator sump volume is a critical scale minimization parameter.

The importance of evaporator sump volume for residence time to achieve chemical equilibrium is implicitly understood in technology currently applied to SAGD application. For example, Canadian Patent No. CA2307819, to Heins (assignee Ionics, Incorporated) (the "Heins patent") reports a process that will raise the pH of the evaporator concentrated brine internal to the evaporator. In such a process where hardness levels typically range from 5 mg/L to 25 mg/L (as CaCO3), the hardness will precipitate from solution as calcium carbonate and magnesium hydroxide. Such reactions require an extended length of time to arrive at equilibrium and come to completion; this can be as long as 4-10 minutes depending on operating conditions. If such a residence time is not provided in the evaporator sump, the precipitate from this softening reaction will take place while at the tube surface which causes scale and suboptimal evaporator performance. Even evaporators provided with long residence times in the evaporator sump will still scale at a certain frequency because it is often impractical to provide sumps large enough to ensure the brine exiting the sump is truly in equilibrium.

Another example of the importance of large evaporator sump volume can be seen in the "Seeded Slurry" or "Sorption Slurry" processes that rely on certain chemical species to preferentially form with an already suspended chemical species. In such systems, the evaporator designer must size the evaporator with a large sump to ensure there exist ample seed surface sites to allow the majority of the precipitating species to attach onto the parent solids. One skilled in the art would also recognize that the method reported by the Heins patent requires a large evaporator sump volume for the seeded slurry process to ensure sufficient seed surface sites exist to lower evaporator heat transfer surface scaling. The method reported by United States Patent Application Publication No. US2009/

0056945, to Minnich, et al. (assignee HPD, LLC) would also require a large evaporator sump to lower evaporator heat transfer surface scaling. Seeded Slurry processes do not prevent evaporator scaling, they merely lower the scaling rate. This type of treatment method offers suboptimal performance since the evaporator will be unavailable to the process at regular intervals for cleaning. The heat transfer efficiency is also suboptimal since the scale that accumulates causes the mechanical vapor compression (MVC) process to consume more electrical power at a given capacity.

The aforementioned reasons have been the rationale behind the selection of co-current VTFF evaporators currently applied in this technical field. However, the technology currently applied has several distinct deficiencies that cause the delivered solutions to be undesirable in some respects. The first deficiency we note is a suboptimal process performance of the evaporators caused by heat transfer scaling/fouling. Even with the provision of a large sump volume, it is impractical to provide a sump with a volume truly large enough to allow the water chemistry to achieve equilibrium in the evaporator sump. Thus, complete mitigation of scaling/fouling is not achieved, which causes electrical power consumption to increase (in terms of kW/evaporation rate) and also requires significant process downtimes for maintenance and cleaning (heat transfer restoration).

Another recognized deficiency is the challenges and costs inherent in the fabrication, transportation (logistics) and installation/construction of evaporators of such immense dimensions. Co-current falling-film evaporators have total heights as tall as 150 feet and weigh several hundred thousands of pounds. Fabrication of such vessels is a specialty that substantially restricts the number of potential suppliers and escalates the cost of supply. The transportation costs are also high because the extreme dimensions of such evaporators cause a requirement for special permits. There is also impact to project schedule since evaporator shipments of such weight are not allowed in some areas due to seasonal road ban restrictions.

A further deficiency is that the fundamental size of the evaporator does not lend itself to modularization. Modularization is a key strategy for minimizing the total installed cost (TIC) of the plant by maximizing the fabrication/assembly shop hours (low unit cost) and minimizing the on-site assembly hours (high unit cost). Since the co-current VTFF evaporators are shipped separately from the balance of the process, they cannot be pre-assembled with pumps, heat exchangers, tanks, piping, and other equipment. This represents additional work that must be performed on-site for a substantial cost.

A final deficiency we note for the technology currently applied is that co-current VTFF evaporators have a center of gravity that is very high above grade (sometimes as high as 60-100 feet). This is a substantial drawback requiring extremely robust civil foundations to be built, which makes their installation even more costly.

BRIEF SUMMARY OF THE INVENTION

Embodiments of the invention provide an evaporation based method for producing high purity distillate from produced water, typically deoiled water in the SAGD process. In one embodiment, steamflood enhanced oil recovery techniques produce an oil and water mixture from a producing well. The oil and water mixture is separated in a deoiling process. The deoiled water is recycled by an evaporator system to create high purity distillate that is suitable for use as feedwater to once-through steam generators or high pressure drum boilers where the distillate is converted to high pressure steam that is injected back into the reservoir through an injection well. The concentrated produced water is blowndown from the evaporator at a high concentration and can be further processed with several technologies, including crystallizer/concentrator for volume minimization, neutralization and deep-well/salt cavern injection, drying operations, solidification and others. The overall water recovery can be >98% by volume.

We have found that the evaporation process may be substantially improved by the design of Counterflow Vertical-Tube Falling-Film (VTFF) Evaporators. Unlike conventionally applied co-current VTFF evaporator technology, counterflow VTFF evaporators are designed without a large sump. This offers enhancements both for optimizing process performance as well as for minimizing the Total Installed Cost of the process. Among other advantages, the counterflow VTFF evaporator can be supplied on a modularized basis. The counterflow VTFF evaporators produce vapor that flows countercurrent (in the opposite or upwards direction) to the falling film instead of co-current (in the same or downwards direction).

Figure 4:
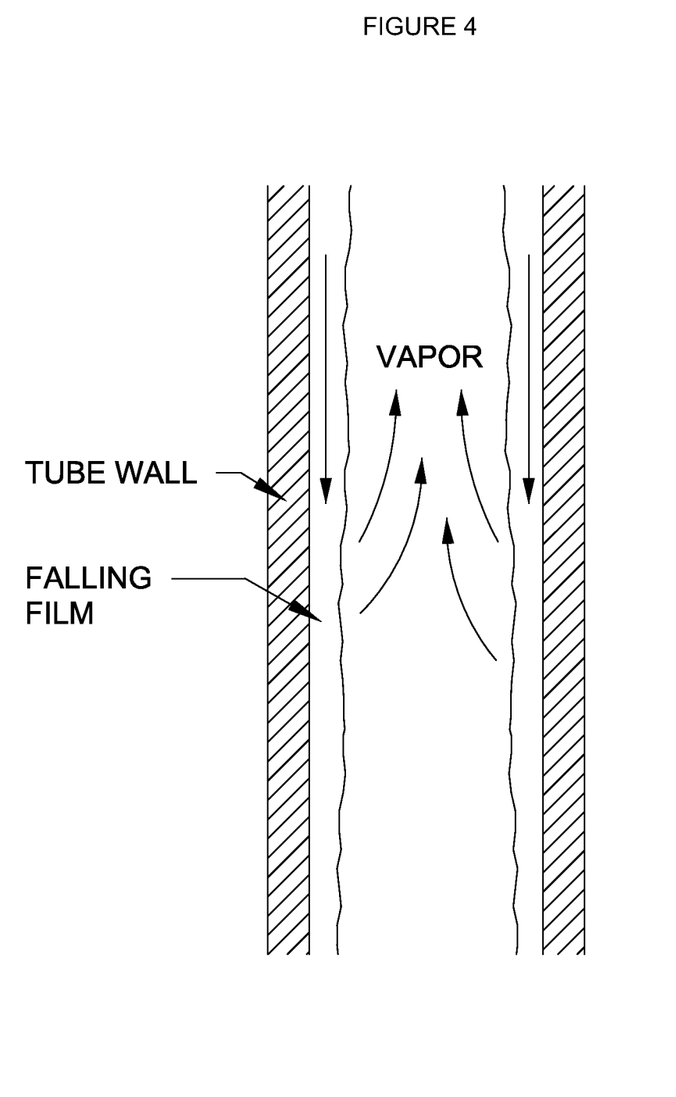
FIG. 4 shows a close-up view of the vapor being generated and flowing in a counterflow manner relative to the falling film in a counterflow VTFF evaporator.
Figure 5:
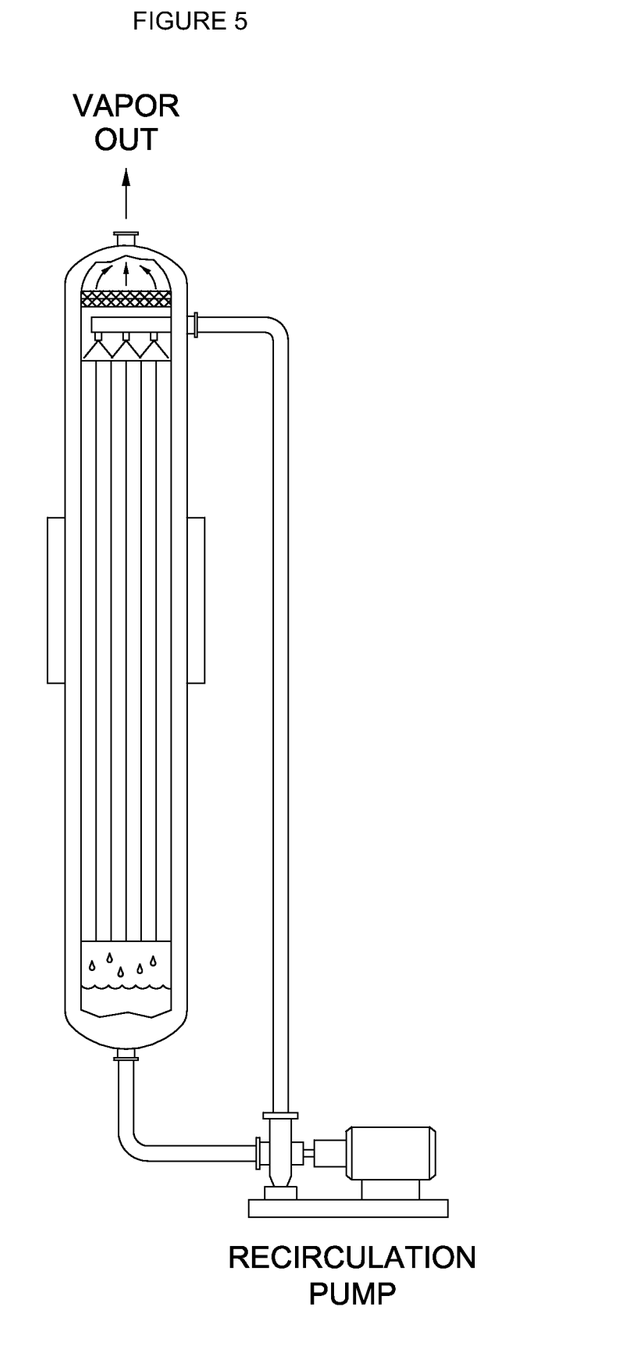
FIG. 5 shows a drawing of a counter-flow VTFF evaporator in which the vapor flows in the opposite direction as the falling film and is disengaged at the top of the heat exchanger.
Figure 6:
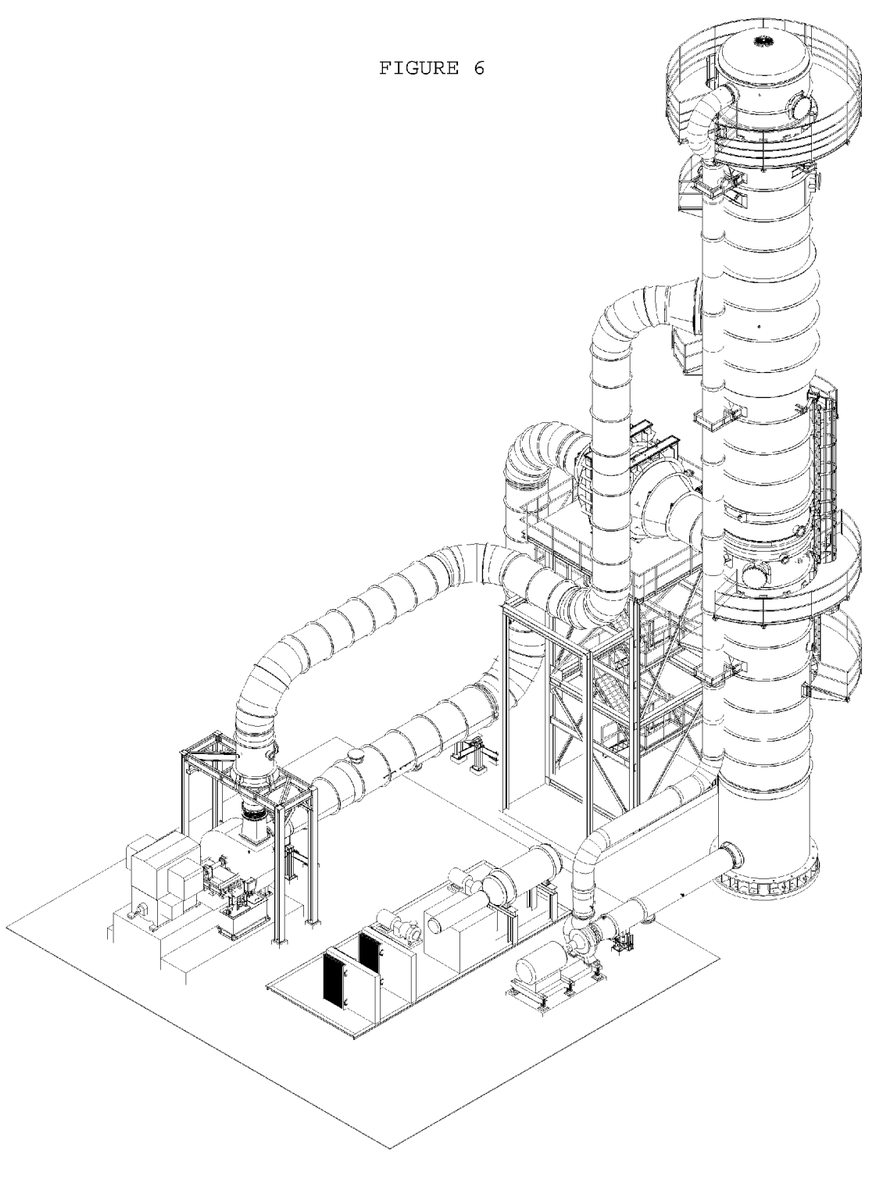
FIG. 6 shows an isometric view of a typical conventional co-current VTFF evaporator
Figure 7:
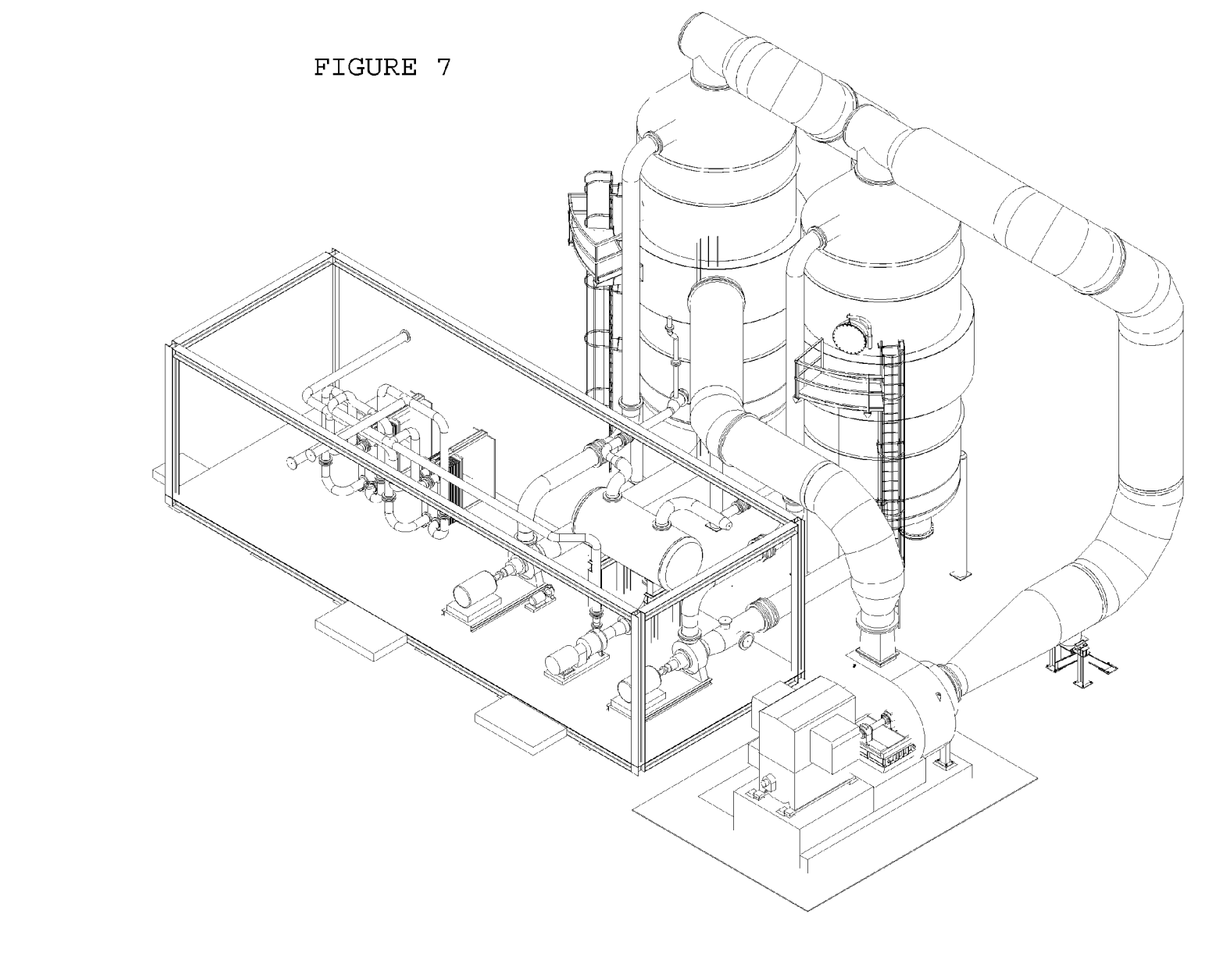
FIG. 7 shows an isometric view of one embodiment of the counter-flow VTFF evaporator system.

Embodiments of the invention may overcome many limitations of the prior art. In one embodiment evaporator technology developed for treatment of deoiled water utilizes a vertical tube heat exchanger bundle where the brine is distributed in a falling film along the inside of the tube wall. Condensing steam causes a portion of the deoiled water to evaporate; this water vapor travels upward, in a countercurrent direction relative to the falling film path. (Refer to FIGS. 4 and 5)

The methods described in this patent improve process performance by formulating the water chemistry to substantially reduce the heat transfer scaling rates, and consequently also improve evaporation heat transfer efficiency and minimize the power consumed by the process. Scaling is mitigated by removing hardness upstream and external to the evaporator vessel through a caustic softening reaction. Sodium hydroxide (or other suitable base) can be mixed with the deoiled water in a softening reaction vessel to remove hardness from the water and in a vessel that is specifically sized for the residence time required for this softening to come to completion. Since the hardness is removed from solution, it is not dissolved or available to cause scaling to the evaporator heat transfer surface. In this method, residence time in the evaporator sump is not required.

Amorphous silica is in equilibrium with various silicate ions at elevated pH and is strongly favoring the ionic silicate form. Silicate solubility is also substantially greater than amorphous silica which allows the majority of silica species to remain soluble at the operating conditions that exist internal to the evaporator. Silicate precipitation mechanisms are strongly influenced by kinetics, and sufficient reaction time must be provided for silicate to precipitate. Since the counterflow falling-film evaporator has essentially no sump, the residence time internal to the evaporator system is absolutely minimized. This means that as silicate concentration increases in the evaporator, the strongly-kinetic reactions are not given time enough to substantially precipitate since the residence time in the evaporator is truly minimal. In this invention, the majority of silica precipitation that would potentially occur would happen in an equalization tank downstream of the evaporator proper. This further mitigates the potential for scale formation on the heat transfer surface area.

The provision of large evaporator sump volume such as that provided in the technology currently used for these applications would provide residence time for silicate precipitation and would increase rates of silica scaling.

Embodiments of the invention also reduce the chemical consumption requirement of the strong base, since the evaporator can operate at lower pH than would otherwise be required to ensure total silica solubility in an evaporator with a very long residence time (i.e. large sump).

This counterflow VTFF evaporator technology also has the advantage of providing a minimal total installed cost (TIC) relative to the conventional technology currently applied (co-current falling-film evaporation). Since the counterflow evaporator is designed to operate at above-neutral pH, the materials of construction for most applications can be low-alloy austenitic or duplex stainless steels, which is a substantially lower cost compared to the materials (such as 6% Molybdenum Stainless Steel) that would be required by a co-current evaporator technology operating at a near-neutral pH.

Further, since the size of each evaporator is now typically less than 50 feet (instead of 150 feet) and typically weighs less than 110,000 pounds (instead of multiple hundreds of thousands of pounds), each evaporator can be contained in the modular assembly prior to shipment to site; this drastically reduces the man-hours associated with construction. The counterflow evaporators can also be supplied by a greater number of fabrication facilities which allows for greater flexibility and lower fabrication cost to supply.

The transportation costs are also much less since the shipping envelope and weight of the evaporator module is much closer to typical roadway loads.

Figure 8:
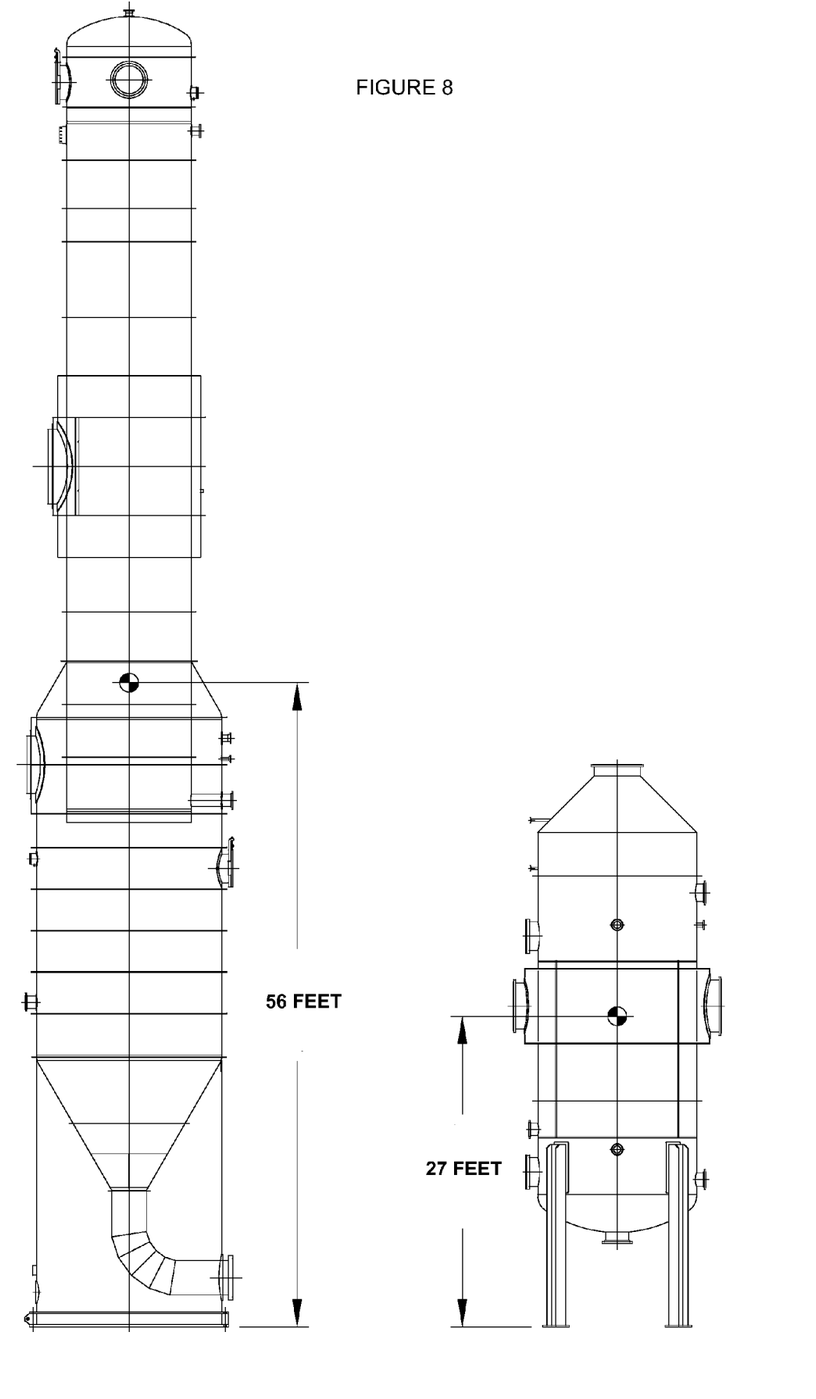
FIG. 8 shows dimensionally scaled drawings of the co-current VTFF evaporator compared to the counterflow VTFF evaporator. These vessels are drawn to the same scale to graphically show the substantial difference in size between the two evaporator types, and more specifically, the difference in sump size.

This technique allows the heat exchanger bundle (the section of the evaporator that holds the most weight) to be located very close to grade which decreases the center-of-gravity of the evaporator system by as much as 30-80 feet. This greatly simplifies the requirements of the civil foundation which allows for substantially lower installation cost. (See FIG. 8).

DETAILED DESCRIPTION OF THE INVENTION

Embodiments of the invention may be better understood by a presentation of a SAGD process including water purification according to an embodiment of the invention. A typical process begins with steam injection and oil extraction. First, steam is injected into an injection well and flows into a reservoir. The steam condenses and transfers energy to underground oil reserves and improves the flowability of the oil. The oil and condensed steam flow to the surface through the producing well.

The oil/water mixture obtained from the producing well is separated in a deoiling process where the oil is recovered for further refining and commercial sale. Although no particular deoiling method is required or preferred, some typical deoiling methods include Bulk Separation Tanks, Free Water Knock-Out Vessels, Skim Tanks, Induced-Gas Flotation and Walnut-Shell Filtration. In other embodiments no deoiling filter is applied. Although substantially free of oil (typically <20 ppm), the water present after completion of deoiling still contains too great a level of impurities for use as boiler feedwater for steam generation in a subsequent SAGD run. These impurities are dissolved solids that are typically on the order of 1,000-5,000 ppm. Boiler feedwater purity guidelines are recommended by boiler manufacturers for specific applications. A drum boiler operating at 1,000 psig, for example, typically requires a feed water with <5 ppm TDS. An evaporator system is used to achieve this reduction in dissolved solids content.

Once deoiled, the process water flows to an evaporator system for water recovery for reuse. The recovered water is produced at a high purity that is suitable for feed to once-through steam generators or high-pressure drum boilers. The evaporator distillate becomes high pressure steam, which is re-injected into the injection well to complete the recycling loop. The concentrated deoiled water is blowndown from the evaporator. Many treatment options are available for this concentrated blowdown stream. One such treatment is further processing by a crystallizer to remove solids and recover >98% of the water.

The deoiled water is fed to an evaporator system with or without make-up water (either fresh or brackish), boiler blowdown and other waste water streams that may be present at an SAGD facility. The feed streams are combined in a header. That header is dosed with an antiscalant or dispersant and heated through heat exchangers by transferring heat from the distillate stream that is leaving the evaporator system. Although the temperature profile of this heat exchanger may vary, typical feed temperatures are around 80° C. and will increase to above 100° C. at the outlet of the exchanger.

The heated feed water is then pumped into a softening reaction vessel where a strong base is added and mixed to precipitate hardness from the solution. Typically the addition of the base increases the pH from approximately 7.0-8.0 to 10.0-10.5. The strong base that is added for pH adjustment is typically sodium hydroxide, however, it is noted that other strong bases may be added additionally or instead. Hardness is present as Calcium and Magnesium in concentrations typically between 5-25 mg/L total hardness. Upon pH adjustment, these cations precipitate as calcium carbonate and magnesium hydroxide, respectively.

The feed water is then sent to a deaerator where it is stripped with steam to remove oxygen and volatile organic compounds that may be present in some concentration in the deoiled water. These volatile compounds may include but are not limited to the following: hydrogen sulfide, various mercaptans, and ammonia. Typically the steam used in the deaerator is venting from the evaporator shell. Depending on the concentrations of volatile compounds exiting the deaerator, the vent may require treatment to mitigate environmental impact. Such systems may include vent condensers, scrubbers, and oxidizers.

The preheated, softened and deaerated feed stream is delivered to the evaporator system where a counterflow VTFF evaporator preconcentrates the produced water by generating distillate and minimizing the wastewater volume fed to a subsequent wastewater treatment step(s). The counterflow VTFF evaporator used in the preconcentration step circulates brine water at a high flow rate to the evaporator top-head where the brine is distributed evenly across the top tubesheet. In the top-head the brine is distributed and flows to the inside tube wall as a falling film.

As the brine flows down the inside of the tube, steam condenses on the outside of the tube and transfers heat to the falling brine film. A fraction of this brine water is vaporized inside the tube and flows upwards toward the top-head as counterflow relative to the falling brine film. The rest of the falling brine film reaches the bottom of the evaporator where it is collected and recirculated to the top-head to continue the evaporative process.

As the vapor is released from the top of the tubes, it flows upwards against the brine distribution spray. The droplet size produced by the spray distributor is relatively large (typically on the order of $1/16"-1/8"$ diameter) and acts as a primary mist removal stage as the fine mist droplets are impacted by the large diameter spray droplets; the mist is incorporated into the spray and travels back toward the evaporator for further evaporation. The vapor in the top head then flows through an internal mist eliminator which provides additional stage(s) of mist elimination with optional vapor scrubbing stages included in some embodiments of the design. The vapor then flows out of the evaporator into a vapor duct. This approach allows efficient mist elimination and vapor scrubbing to be achieved internal to the evaporator vessel. Mist eliminators can be, for example, mesh pad type, chevrons, agglomerators or combinations thereof. Mist eliminators may be internal or external, or a combination of internal and external mist eliminators may be used.

The distillate produced by the counterflow evaporator system is of a quality suitable to be used immediately as feedwater to a high pressure drum boilers or once-though steam generators. Subsequent treatment steps (including electro-deionization or mixed-bed ion exchangers) are not necessary. Steam is generated and is injected into the reservoir to complete the SAGD process.

In a preferred embodiment the counterflow falling film evaporator configuration includes four evaporator vessels that make up two effects; each effect is made up of two evaporator vessels. In this embodiment the vapor that is produced by the first-effect evaporators is collected in a header and distributed to the shell side of the two second-effect evaporators. The vapor that is produced by the second-effect evaporators is collected in a header and sent to a mechanical compressor where the vapor pressure is increased. From the compressor, the vapor is sent back to the first effect shell side to recycle the energy in the MVC process.

The brine is sent through the four evaporator vessels in series, beginning with evaporator #1A, then evaporator #1B, then evaporator #2A, then evaporator #2B. Final concentration is achieved in evaporator #2B and a small blowdown stream is pumped from the counterflow VTFF evaporator preconcentration stage. The evaporator blowdown stream can be treated with several technologies including but not limited to crystallization, drying, dewatering, solidification or combinations of these to achieve ZLD.

In a preferred embodiment each of the four evaporators has a very small and straight sump. This sump collects the falling brine film as it leaves the tubes and sends the brine into the recirculation pump suction.

The development of this counterflow evaporator process represents a novel treatment method for deoiled water recovery. In the technology currently practiced, design emphasis is placed on maximizing the evaporator sump volume to attempt to achieve chemical equilibrium in the sump prior to circulating the brine to heat exchange surface. The counterflow evaporator process intentionally eliminates sump volume to minimize the residence time of the brine in the evaporator system. The brine feed is treated upstream of the evaporator and achieves equilibrium prior to entering the evaporator(s). Then, as silicate concentration increases in the evaporator (increase due to evaporation), the strongly-kinetic silicate precipitation reactions are not given time enough to substantially precipitate since the residence time in the evaporator system is truly minimized. In this invention, silica precipitation and soluble equilibrium are achieved in an equalization tank downstream of the evaporator proper. This further mitigates the potential for scale formation on the heat transfer surface area. The counterflow evaporator system thus operates with higher net availability and with lower power consumption rates, since larger overall heat transfer coefficients are maintained due to lack of scaling.

An additional advantage of the counterflow evaporator design is that the use of the small, straight sumps mitigates the propensity for the accumulation of oil and organics in the sump. Accumulation of oil and organics worsen the distillate purity because they cause foam to build-up that carries over into the distillate. Since the sump is extremely small and maintains high liquid velocity throughout the sump, the oil and organics that are typical in deoiled water are given no quiescent regions in which to accumulate. Antifoam chemical dosing requirements are optimally low in this configuration since the liquid residence time is minimized and since there are no quiescent volumes in which partially miscible phases can form and accumulate. If anti-foaming chemicals are desirable, they would typically be added in amounts from 0 ppm to 5 ppm with this invention.

Embodiments of the invention also reduce the chemical consumption requirement of the strong base since the evaporator can operate at lower pH than would otherwise be required to ensure total silica solubility in an evaporator with a very long residence time (i.e. large sump).

Evaporators used in embodiments of the invention have sump sizes that would typically be regarded by one of skill in the art as too small for use in SAGD applications. For example, counterflow (or, as is used in the alternative throughout this disclosure, countercurrent) evaporators may have sump volumes between 0-50 $m^3$, 0-40 $m^3$, 0-30 $m^3$, 0-20 $m^3$, 0-15 $m^3$, 0-10 $m^3$, 0-5 $m^3$, 0-4 $m^3$, 0-3 $m^3$, 0-2 $m^3$, 0-1.5 $m^3$, 0-1.0 $m^3$, 10-50 $m^3$, 10-40 $m^3$, 10-30 $m^3$, 10-20 $m^3$, 20-40 $m^3$, 20-30 $m^3$, or 20-50 $m^3$. These volumes may handle significant feed flow, which in some embodiments may be as high as 200 $m^3$/h, 300 $m^3$/h, 400 $m^3$/h, or 500 $m^3$/h. Feed flow may be increased by placing multiple evaporators in communication either in series or in parallel.

EXAMPLE

Embodiments and aspects of the invention may be further understood by reference to the example below. The example should be understood to show exemplary aspects of the invention, but should not be construed to limit the claims.

For the purposes of this example, assume a 5,000 bpd SAGD oil production facility having a continuous boiler feedwater requirement of 273 m³/h. The high pressure drum boiler produces steam for injection into the underground formation. An oil and water mixture is pumped to the surface through the producing well. The oil is separated and removed as product. The separated water receives further treatment for oil removal to the order of <20 mg/L. This water is termed "deoiled water" and is now ready for treatment by the evaporator system. Further assume that the rate of deoiled water production is 287 m³/h and that the evaporator system concentrates this stream approximately 20 times to produce a high-purity distillate stream of 273 m³/h (equal to the boiler feedwater requirement) and a brine blowdown stream of 14 m³/h.

Consider a conventional evaporator system that is designed with the process as described in the Heins patent. In such a process, the deoiled water is preheated by exchanging heat with the hot distillate leaving the evaporator. The preheated deoiled water is now at boiling temperature and is passed through a deaerator where vent steam from the evaporator is used to strip non condensable gases and volatile compounds. The deoiled water exists at a near-neutral pH (7<pH<8) and is fed to the evaporator.

In that conventional treatment method, the evaporator system could be designed as two evaporators arranged in a series configuration, such that the brine concentrated in Evaporator #1 is blowndown and fed to Evaporator #2. The design philosophy described in the Heins patent includes the dosing of caustic directly to the evaporator sump(s) to elevate the pH and increase solubility of various silicates. This pH adjustment stimulates the precipitation of several salt species, including calcium carbonate, magnesium silicate. Since this precipitation is occurring internal to the evaporator(s), it is essential that complete precipitation occurs in the evaporator sump and prior to recirculation and distribution of brine water onto the tube surface. Precipitation that occurs at the tube surface will cause scaling. In recognition of this fact, the conventional evaporator utilized is a vertical-tube falling film evaporator with a very large sump to maximize the residence time for reaction. Each evaporator has a sump sized for approximately 125 cubic meters of normal liquid volume which makes the total sump volume 250 cubic meters. Since the evaporator system has a blowdown flow rate of 14 m³/h, the sump residence time is 17.9 hours. (See Table 1)

The primary shortcoming of the conventional technology is that the evaporator will still experience scaling of the tube surface, because the precipitation is not completed in the evaporator sump and a portion of the precipitation reactions occur at the tube surface. After this is experienced, the design of future evaporators would include evaporators with even larger sump-sizes to provide longer residence times in an attempt to precipitate, in the sump, the salts that are currently precipitating on the tube surface.

However, it turns out that with this process scaling of the evaporator cannot be eliminated because it is impractical to make sump sizes large enough to achieve the necessary residence time for precipitation in the sump. In fact, we find the opposite is true. It is known that silicates that are supersaturated can remain solubilized and stable for some time since their precipitation from solution is strongly influenced by kinetics. As the sump volume is increased, the available reaction time is also increased, which actually increases the scaling rate of these kinetically-driven silicates.

In light of this finding, we have developed an improved process for the evaporative treatment of deoiled water. An example of one embodiment of our invention would be as follows. The deoiled water is sent through a heat exchanger for preheating with the hot distillate flowing out of the system. The preheated deoiled water is then pumped to a softening reaction vessel. Caustic is added in the reaction vessel and approximately 10 minutes of residence time is provided to allow for hardness precipitation upstream of the evaporator system. The deoiled water is then passed through a deaerator where non condensable gases and volatile compounds are stripped from the liquid with vent steam from the evaporator. The deoiled water is then pumped into the evaporator.

In this process, the design philosophy is to minimize the residence time of the brine inside the evaporator system. To achieve this, we have designed Counterflow VTFF Evaporators for this application. Counterflow Evaporators for this application are optimal since they truly minimize sump volume and available reaction time. In this example, for instance, a typical design would include four separate Counterflow VTFF's arranged in series. Each Counterflow VTFF Evaporator has a sump volume of 1 cubic meter for a total sump volume of 4 cubic meters. Since the blowdown flow rate is 14 m³/h, the total available residence time for reaction is only 0.3 hours. (See Table 1)

This example shows that the residence time available for reaction can be minimized with the utilization of a Counterflow VTFF Evaporator process. This means that as silicate concentration increases in the evaporator, the strongly-kinetic reactions are not given time enough to substantially precipitate. In this invention, the majority of silica precipitation that would occur would happen in an equalization tank downstream of the evaporator proper. This further reduces the potential for scale formation on the heat transfer surface area. It is noted that the provision of large evaporator sump volume such as that provided in the technology currently applied, would provide residence time for silicate precipitation and would increase rates of silica scaling.

TABLE 1

| | Conventional VTFF | Counterflow VTFF |
|---|---|---|
| Feed Flow, Total (m³/h) | 287 | 287 |
| Distillate Flow, Total (m³/h) | 273 | 273 |
| Blowdown Flow, Total (m³/h) | 14 | 14 |
| Evaporator Quantity, In Series | 2 | 4 |
| Sump Volume, Each (m³) | 125 | 1 |
| Sump Volume, Total (m³) | 250 | 4 |
| Residence Time (hours) | 17.9 | 0.3 |

We claim:

1. A method of treating water for heavy oil production, comprising:
   (a) separating an oil and water mixture obtained from an injection well into separate mixtures of oil and produced water;
   (b) sending said produced water to a header of an evaporator system as evaporator feedwater;
   (c) preconcentrating the produced water in a vertical tube counterflow falling-film evaporator in a plurality of vessels and having a plurality of tubes, a top-head and a sump, wherein said sump has a volume between 0 and 10 m³;
   (d) circulating the produced water to the top-head of said evaporator where said produced water as a brine is distributed to create a falling film inside the evaporator tubes;
   (e) transferring energy to the falling film by condensing steam external to a tube causing a portion of the produced water to evaporate as water vapor and causing the balance of the produced water in the falling film to become concentrated;

(f) removing said concentrated produced water from the evaporator for downstream treatment/disposal;

(g) sending said water vapor to a condenser where it condenses as distillate which is fed to a high pressure drum boiler or once through steam generator; and (h) sending said high pressure steam to an injection well.

2. The method of claim 1, further comprising dosing said produced water in the header with at least one member of the group consisting of antiscalant and dispersant.

3. The method of claim 1, further comprising heating the produced water in the header.

4. The method of claim 1, further comprising adding a base to the produced water, thereby removing hardness from the produced water prior to the step of preconcentrating the produced water in a vertical tube counterflow falling-film evaporator having a plurality of tubes, a top-head and a sump.

5. The method of claim 4, comprising allowing the produced water to achieve equilibrium upstream of subsequent evaporation steps following addition of the base.

6. The method of claim 1, comprising deaerating the produced water prior to the step of preconcentrating the produced water.

7. The method of claim 1, comprising, between the steps of sending the produced water to the header and preconcentrating the produced water, the steps of:

heating the produced water in the header;

adding a base to the produced water, thereby removing hardness from the produced water and allowing the water to achieve equilibrium upstream of subsequent evaporation steps; and deaerating said produced water.

8. The method of claim 1, further comprising adding of make-up water to the feed header to produce a blended evaporator feed.

9. The method of claim 8, wherein said make-up water is selected from the group consisting of brackish water, fresh water, boiler blowdown, and crystallizer distillate.

10. The method of claim 1, further comprising dosing said produced water with a chemical agent to perform at least one of stabilizing and enhancing the solubility of at least one of silica and a silicate.

11. The method of claim 1, wherein the produced water in the header is heated with excess heat transferred from a distillate stream leaving said evaporator.

12. The method of claim 1, comprising passing the water vapor through at least one mist elimination stage.

13. The method of claim 12, wherein said at least one mist elimination stage is an internal mist eliminator or external mist eliminator and is selected from the group consisting of a mesh pad eliminator, chevron eliminator, agglomerator, and combinations thereof.

14. The method of claim 1, further comprising treating said vapor with vapor scrubbing operations.

15. The method of claim 1, wherein said counterflow vertical-tube falling-film evaporator comprises four evaporator vessels making up two effects.

16. The method of claim 1, further comprising sending said evaporator blowdown to a forced circulation evaporator for further concentration and water recovery.

17. The method of claim 1, further comprising sending said evaporator blowdown to a brine stabilization and solidification process to create a single, solid disposal stream.

18. The method of claim 1, further comprising sending said evaporator blowdown to a dryer to produce a solid disposal stream.

19. The method of claim 1, further comprising sending said evaporator blowdown to a neutralization process for injection in a salt cavern for disposal.

20. The method of claim 1, further comprising sending said evaporator blowdown to a neutralization/clarification process to prepare blowdown for injection in a deep-well for disposal.

21. The method of claim 1, further comprising the step of deoiling said produced water.

22. The method of claim 1, wherein said evaporator has a single effect in two vessels.

* * * * *